(12) United States Patent
Adams et al.

(10) Patent No.: US 8,781,443 B2
(45) Date of Patent: *Jul. 15, 2014

(54) SYSTEM AND METHOD FOR HANDLING MESSAGE RECEIPT NOTIFICATION

(71) Applicant: Blackberry Limited, Waterloo (CA)

(72) Inventors: Neil Patrick Adams, Waterloo (CA); Herbert Anthony Little, Waterloo (CA); Michael Stephen Brown, Waterloo (CA); Michael Kenneth Brown, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/891,465

(22) Filed: May 10, 2013

(65) Prior Publication Data

US 2013/0288646 A1 Oct. 31, 2013

Related U.S. Application Data

(63) Continuation of application No. 13/616,674, filed on Sep. 14, 2012, now Pat. No. 8,463,243, which is a continuation of application No. 11/518,104, filed on Jun. 21, 2005, now Pat. No. 8,331,911.

(60) Provisional application No. 60/581,644, filed on Jun. 21, 2004.

(51) Int. Cl.
   *H04M 3/42* (2006.01)

(52) U.S. Cl.
   USPC ...... 455/411; 455/566; 455/414.2; 455/414.1

(58) Field of Classification Search
   USPC .................... 455/414.2, 566, 414.1
   See application file for complete search history.

(56) References Cited

U.S. PATENT DOCUMENTS

| | | | |
|---|---|---|---|
| 5,448,561 A * | 9/1995 | Kaiser et al. | 370/471 |
| 5,629,982 A | 5/1997 | Micali | |
| 6,323,754 B1 * | 11/2001 | Simons | 340/7.43 |
| 6,678,361 B2 * | 1/2004 | Rooke et al. | 379/93.24 |
| 2002/0143710 A1 * | 10/2002 | Liu | 705/75 |
| 2003/0200184 A1 * | 10/2003 | Dominguez et al. | 705/78 |

FOREIGN PATENT DOCUMENTS

| | | |
|---|---|---|
| CA | 2141900 | 9/1995 |
| WO | 00/49766 | 8/2000 |
| WO | 01/17165 | 3/2001 |

OTHER PUBLICATIONS

Hoffman, "Enhanced Security Services for S/MIME", Internet Mail Consortium, Jun. 1999, Retrieved from the internet at www.apps.ietf.org/rfc/rfc2634.html, p. 10, section 2-p. 24, section 2, pp. 11-48.
International Patent Application No. PCT/CA2005/000962, Search Report dated Sep. 7, 2005, 3 pages.
U.S. Appl. No. 11/158,104, Notice of Allowance dated Sep. 4, 2012.
U.S. Appl. No. 13/616,674, Notice of Allowance dated Feb. 20, 2013.

* cited by examiner

*Primary Examiner* — Charles Shedrick
(74) *Attorney, Agent, or Firm* — Alexander Anishchenko; Bordon Ladner Gervais LLP

(57) ABSTRACT

Systems and methods for operation upon a wireless mobile device to handle message notifications. A method can include receiving a message by the wireless mobile device over a wireless communications network. The received message is processed so that at least a portion of the sender's message is displayed to a user of the wireless mobile device before a signed receipt is provided to the sender.

18 Claims, 10 Drawing Sheets

SYSTEM AND METHOD FOR HANDLING MESSAGE RECEIPT NOTIFICATION

BACKGROUND

1. Technical Field

This document relates generally to the field of communications, and in particular to handling messages on mobile wireless communications devices.

2. Description of the Related Art

Mobile wireless devices are configured to send and receive messages, such as e-mail messages. Typically a signed receipt is sent before a user is allowed to view a message. Additionally, a message may have to be verified before the signed receipt is sent. To verify the message typically all of the message has to be present. This can be difficult to perform on a constrained device, such as a mobile device, because it may take a while to receive enough of the message on the device to verify. In fact, a device may never receive the entire message, such as when the message is relatively long or in other situations (e.g., when the message is received and viewed in portions or chunks). Additionally in some situations, there may not be a mechanism to receive the entire message until a user starts to view the message (e.g., when a user has to request additional message chunks while viewing a message).

DETAILED DESCRIPTION OF THE DRAWINGS

Figure 1:
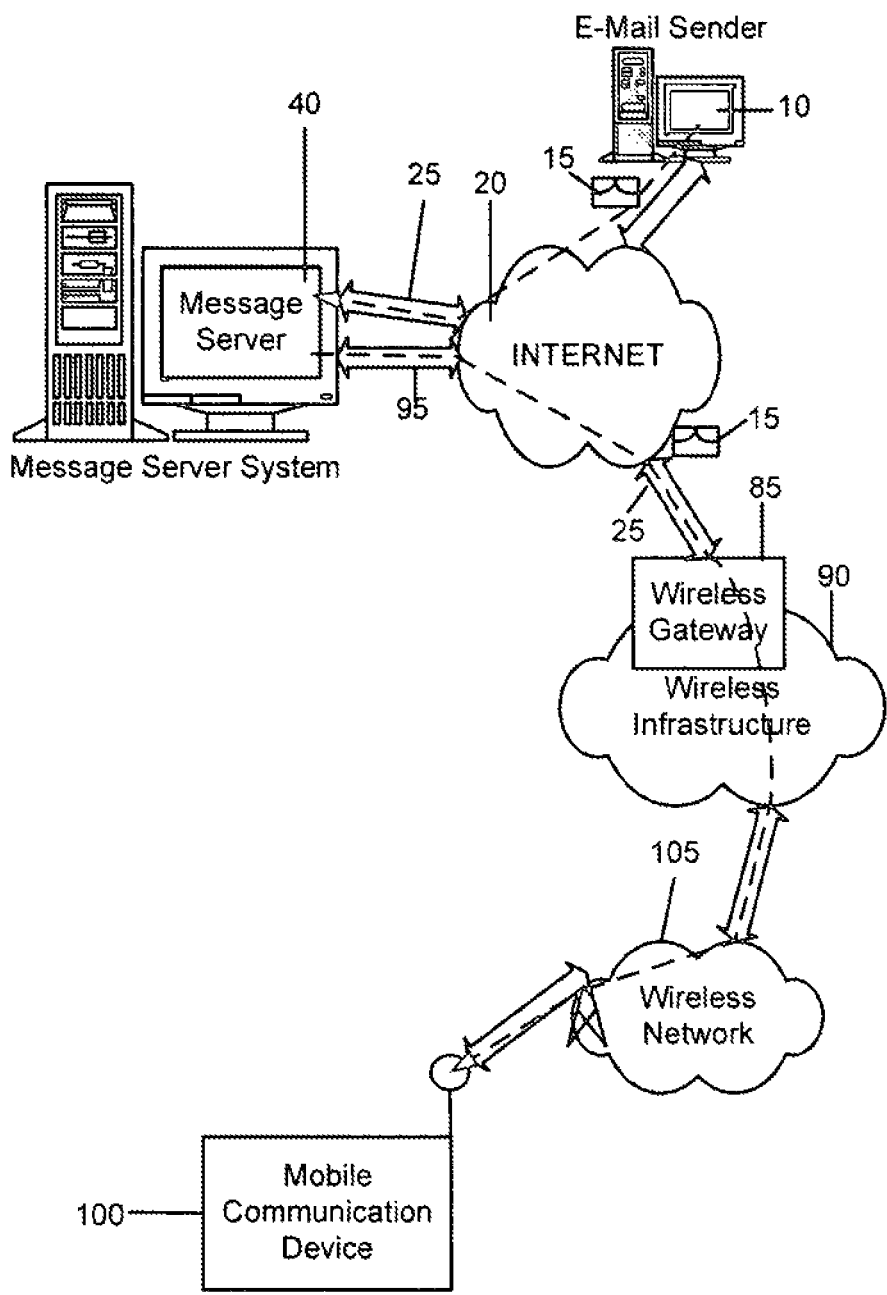
FIG. 1 is an overview of an example communication system in which a wireless communication device may be used.

FIG. 1 is an overview of an example communication system in which a wireless communication device may be used. One skilled in the art will appreciate that there may be hundreds of different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/

IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
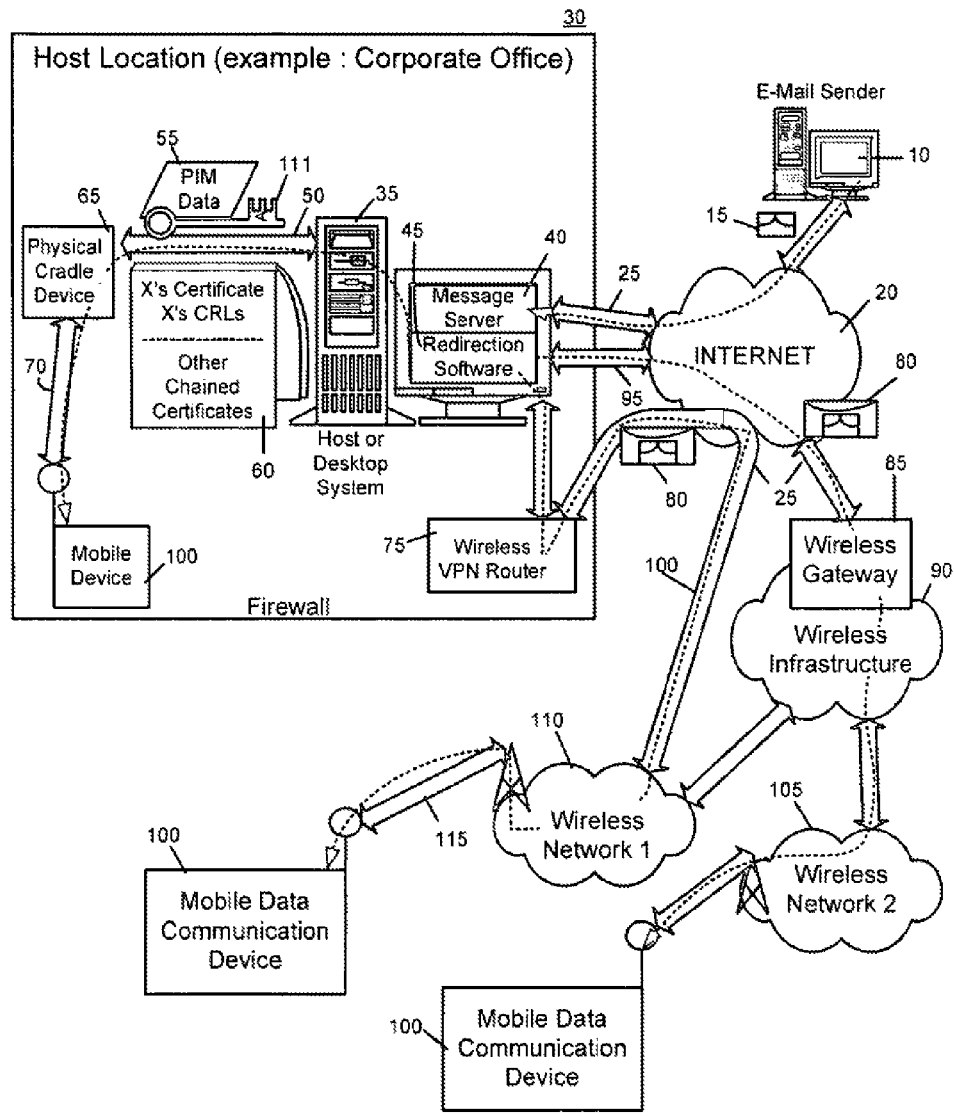
FIG. 2 is a block diagram of a further example communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 30, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other private system where mail messages are being exchanged. Within the host system 30 is the message server 40, running on some computer within the firewall of the host system, that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 patent"), entitled "System and Method for Pushing Information From A Host System To A Mobile Data Communication Device Having A Shared Electronic Address," and issued to the assignee of the instant application on Apr. 17, 2001, which is hereby incorporated into the present application by reference. This push technique may use a wireless friendly encoding, compression and encryption technique to deliver all information to a mobile device, thus effectively extending the security firewall to include each mobile device 100 associated with the host system 30.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 40 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Figure 3:
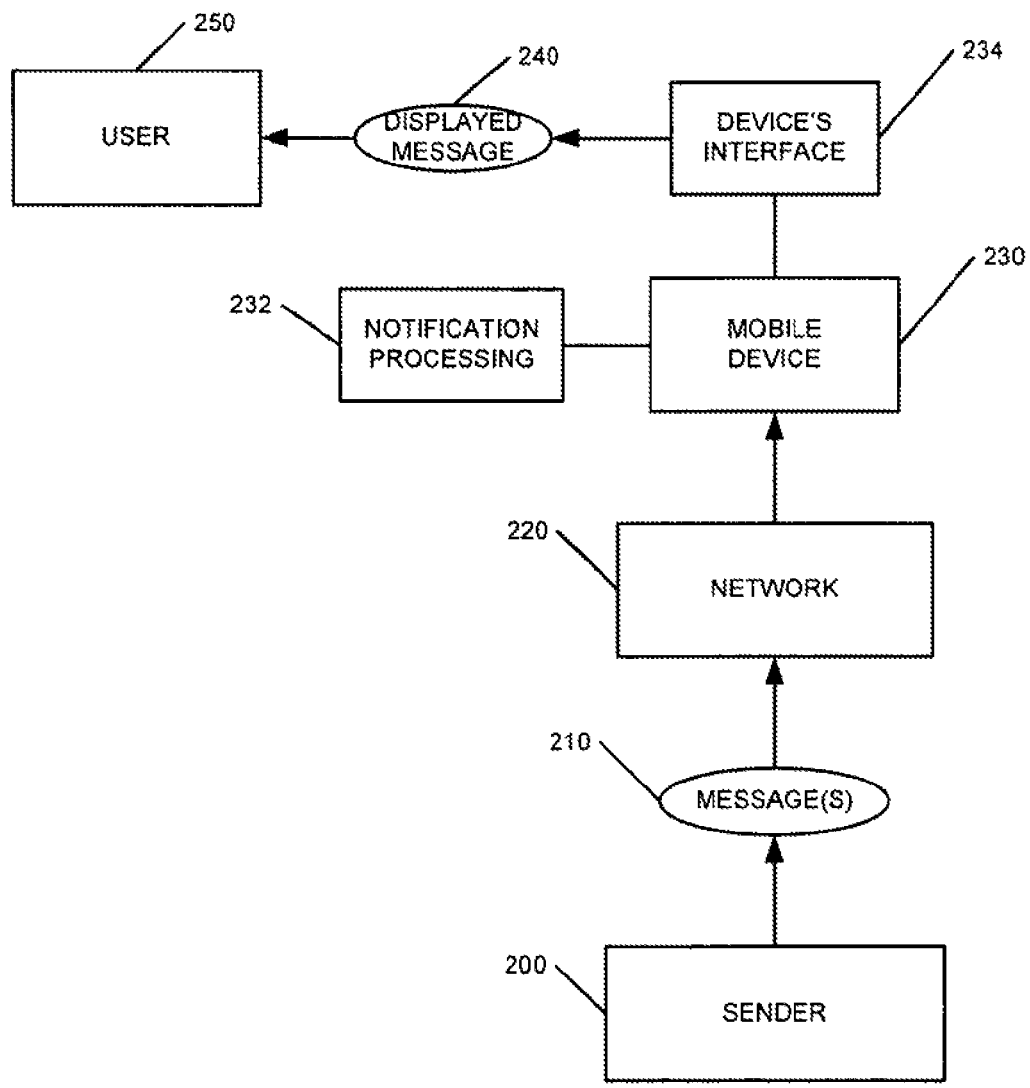
FIG. 3 is a block diagram depicting a system for handling messages received over a network.

FIG. 3 depicts a mobile device 230 (e.g., a wireless mobile communications device) receiving one or more messages 210 from a sender 200 over a network 220. The messages 210 can be e-mail messages or another type of communication from the sender 200. In the example of FIG. 3, the sender 200 has requested that a signed receipt be sent back from the mobile device 230.

To handle the processing of the received message 210 and the requested signed receipt, the mobile device 230 includes notification processing instructions 232. The notification processing instructions 232 process the received message 210 so that at least a portion 240 of the sender's message is displayed on the device's interface 234 to the user 250.

Figure 4:
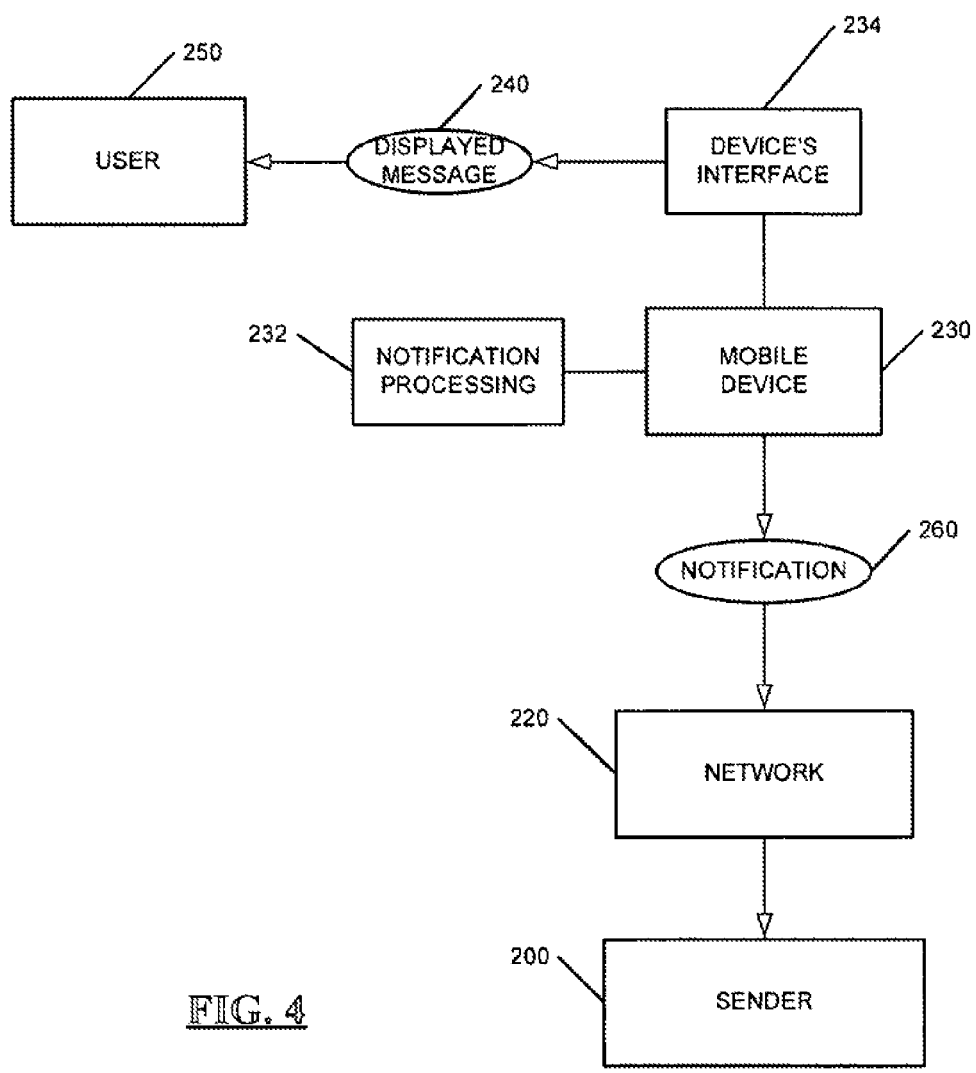
FIG. 4 is a block diagram depicting a system for providing signed receipt notifications.

FIG. 4 shows more specifically that the notification processing instructions 232 allows a received message (or the message portion(s) that have been received thus far) to be displayed on the device's interface 234 to the user 250 before a notification 260 (e.g., a signed receipt) is provided to the sender. Accordingly, this allows the notification 260 to be sent while also allowing the user 250 to view the displayed message 240 on the mobile device 230.

Figure 5:
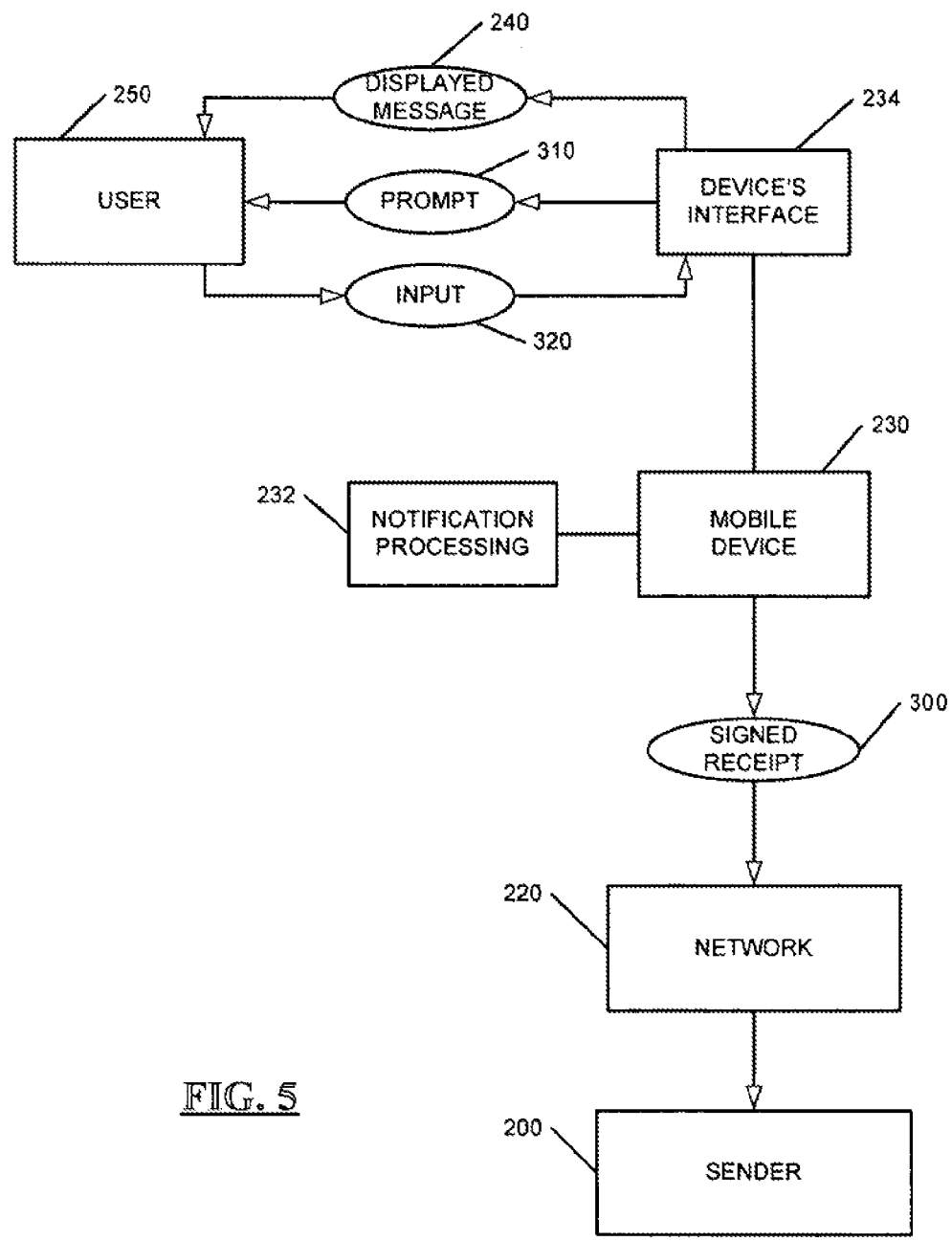
FIG. 5 is a block diagram depicting a system that interacts with a user in order to provide signed receipt notifications.

FIG. 5 illustrates that the device 230 on which the user 250 is viewing a received message can send the notification 260 in many different ways, such as manually or automatically. For example, the user 250 can be prompted through prompt 310 to send a signed receipt 300 when the user 250 exits the displayed message 234 irrespective of whether the entire message of the sender has been sent to the device 230. The user 250 can provide any information needed to handle the viewing and sending of the signed receipt 300 by supplying input 320 to the device 230. The user 250 can also be prompted for any additional information as well, such as their password, for use in generating a digitally signed receipt 300.

Figure 6:
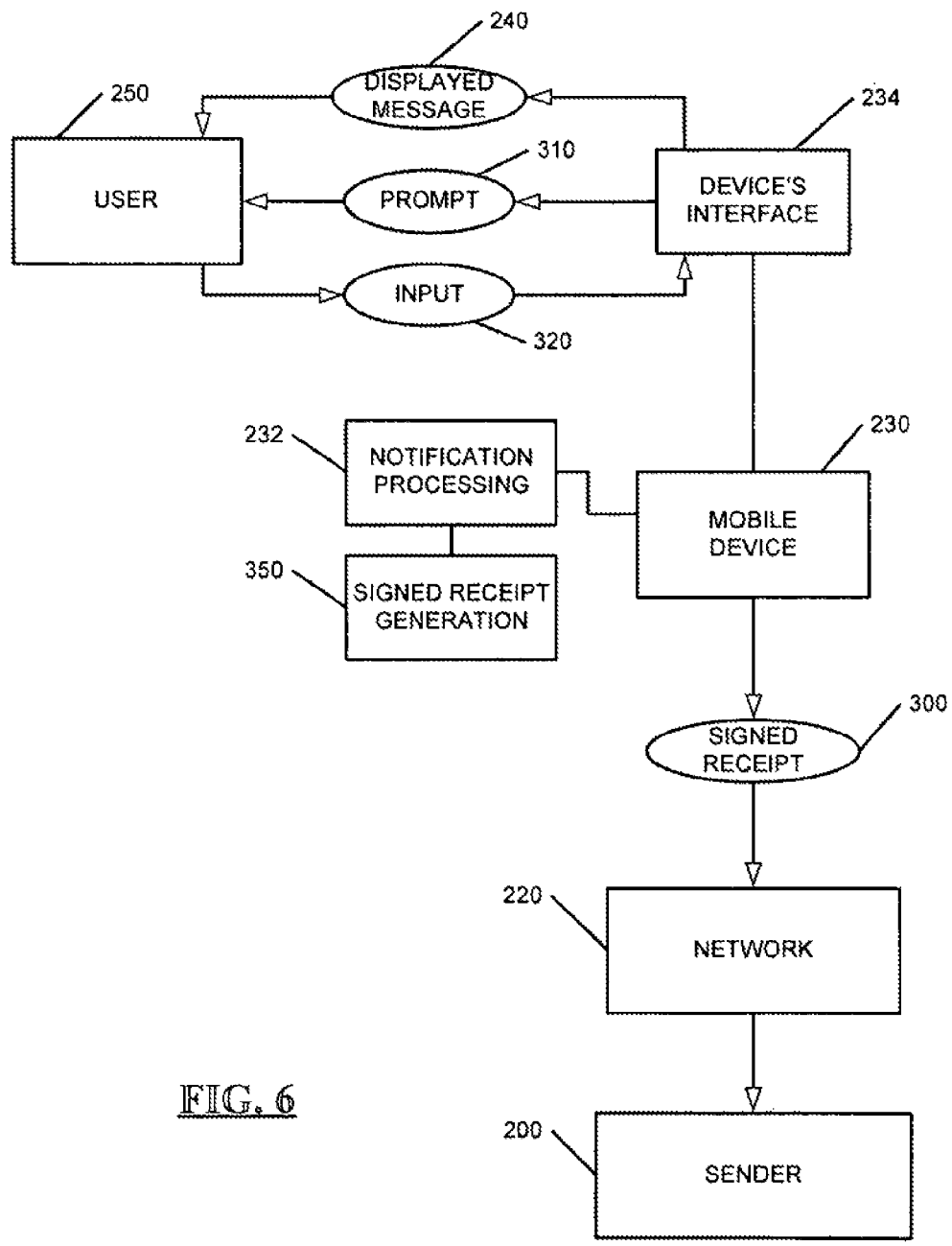
FIG. 6 is a block diagram depicting use of signed receipt generation functionality in order to generate a signed receipt.

FIG. 6 depicts that the notification processing instruction 232 can have access to functionality or instructions 350 to handle generation of a signed receipt. The signed receipt generation instructions 350 can be configured such that the notification process occurs in an automatic manner. For example, if a user's private key(s) were encrypted with a low security password that would not require prompting the user, the signed receipt can be automatically sent without user intervention.

Other approaches may be used as well, such as the device 230 prompting at 310 the user 250 for their password to decrypt the private key in order to sign the message, at which point the user could cancel and the signed receipt would not be sent. The user may also not have to supply their password before they exit the message since the user has already been shown the message.

Figure 7:
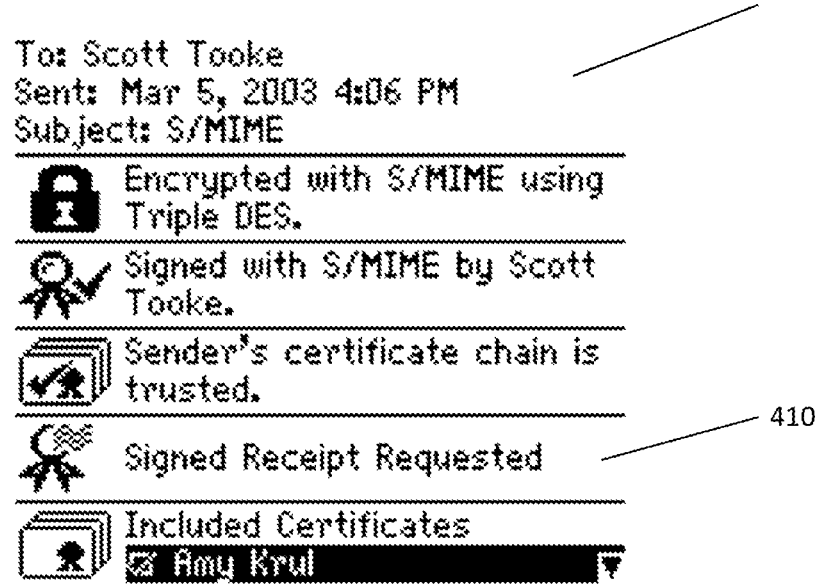
FIG. 7 is a user interface that provides one or more indicators regarding a signed receipt notification.

An interface can provide one or more indicators regarding a message's notification process status. For example, the device can display an icon indicating whether notification has been sent. This can be helpful since the signed receipt may or may not have been sent for a particular message. A menu item can also be provided to force the receipt to be sent before exiting the message if that is desired. An indication can also be shown within a sent message that a signed receipt was requested. (It is noted that in a typical desktop implementation, such an indication is not needed because it is assumed that the signed receipt has been sent before the user views the message because the desktop computer has the entire message.) FIG. 7 provides an illustration of an indication 410 being provided through interface 400 that a signed receipt is requested.

Figure 8:
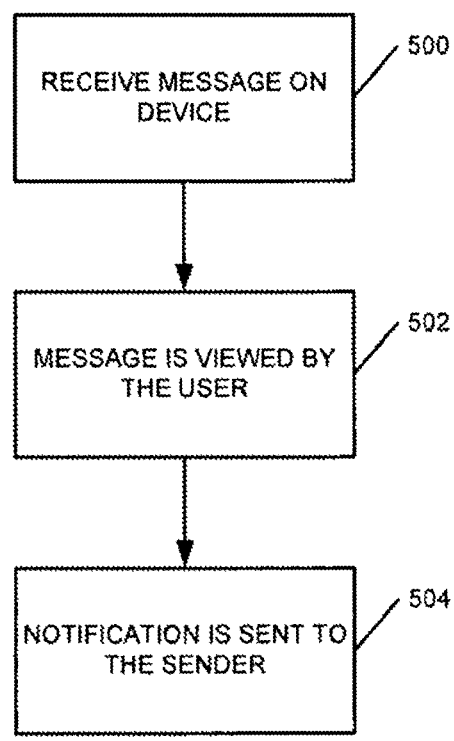
FIG. 8 is a flowchart depicting an example operational scenario wherein a message that is received by a mobile device is processed in order to generate a signed receipt.

FIG. 8 depicts an example operational scenario wherein a message is received by a mobile device at step 500 over a network. The entire message or a portion of the sent message may have been received by the mobile device. At step 502, the message is viewed by the user. When the notification can be generated, the notification is sent to the sender at step 504.

Figure 9:
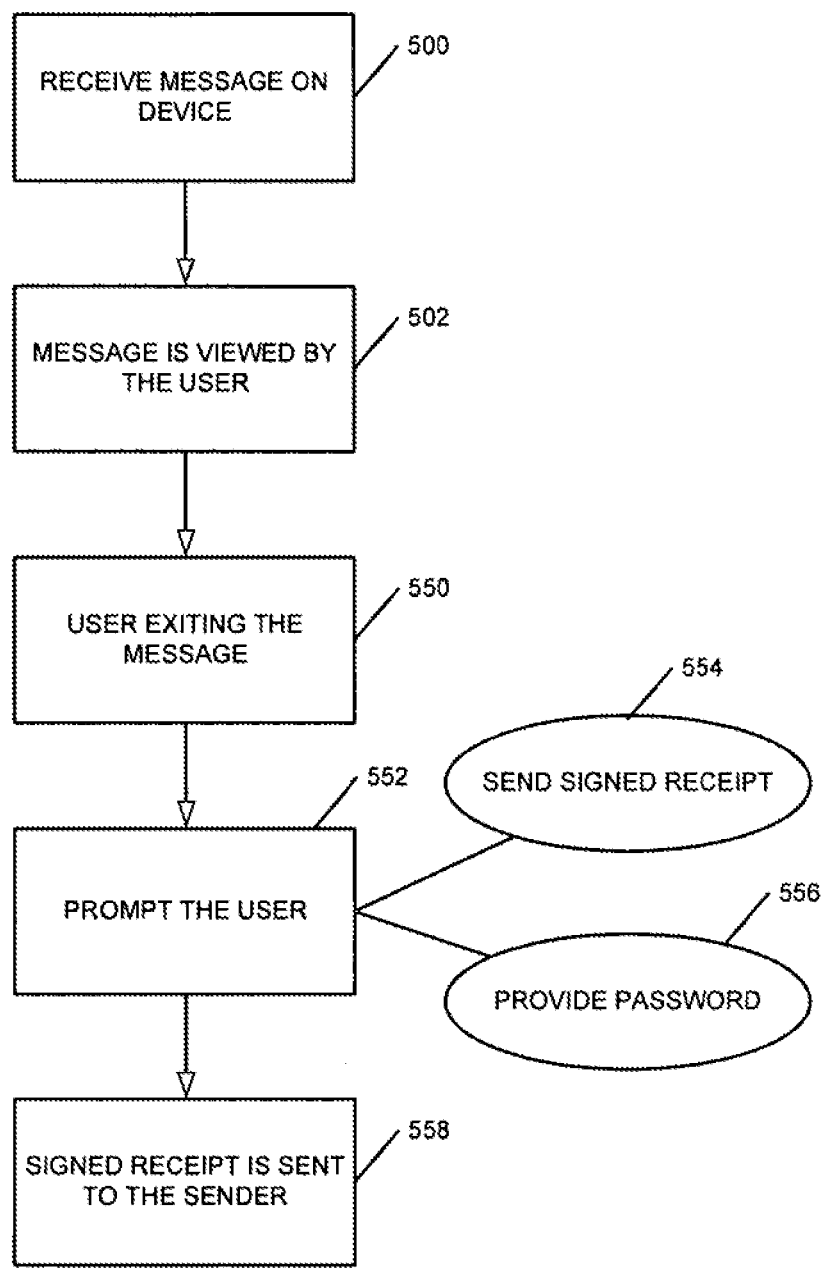
FIG. 9 is a flowchart depicting an example operational scenario that illustrates interaction with a user in order to provide signed receipt notifications.

The systems and methods disclosed herein are presented only by way of example and are not meant to limit the scope of the invention. Other variations of the systems and methods described above will be apparent to those skilled in the art and as such are considered to be within the scope of the invention. For example, FIG. 9 illustrates that after the message is being displayed at step 502 to the user, the user can elect to exit the message 550, whereupon the user can be prompted via prompt 554 as to whether to send the signed receipt and/or, if needed, to provide a password via prompt 556. If the user has indicated that the signed receipt is to be sent and the necessary information to generate the signed receipt has been provided, then the signed receipt is generated and sent to the sender at step 558. The sender receives the message and validates that it contains a signed receipt for the original message.

In this operational scenario, the signed receipt can be generated in different ways, such as through software instructions (e.g., signed receipt generation instructions 350 of FIG. 6) that have been configured to digitally sign a receipt for use in acknowledging that the message was successfully delivered and verified.

As another example of the wide scope of the systems and methods disclosed herein, a system and method could be configured to handle the sending of a signed receipt when receiving the message in pieces or chunks at a time. In a resource constrained device, a device can request to receive chunks of the message upon request of the user to view more of the message. The device can send a signed receipt when the last more message chunk arrives which allows a mobile device to verify the message and thus send the signed receipt (or the receipt can be sent as otherwise disclosed herein).

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein. Illustrations of the systems and methods include but are not limited to a mobile device being able to send a signed receipt notification although the entire message may not have been received yet. As another illustration, a system and method can include receiving a message by the wireless mobile device over a wireless communications network, wherein a sender composed the message intended for receipt by at least one recipient. The received message is processed so that at least a portion of the sender's message is displayed to a user of the wireless mobile device before a signed receipt is provided to the sender. As another illustration, a system and method can be configured to include notification processing instructions that can process a message received by the wireless mobile device over a wireless communications network, wherein a sender composed the message intended for receipt by a specific recipient. Signed receipt generation instructions are used to generate a signed receipt based upon the received message. The notification processing instructions are configured to process the received message so that at least a portion of the sender's message is displayed to a user of the wireless mobile device before the generated signed receipt is provided to the sender. The signed receipt can be used at least in part to confirm whether the specific recipient had received the sender's message.

Figure 10:
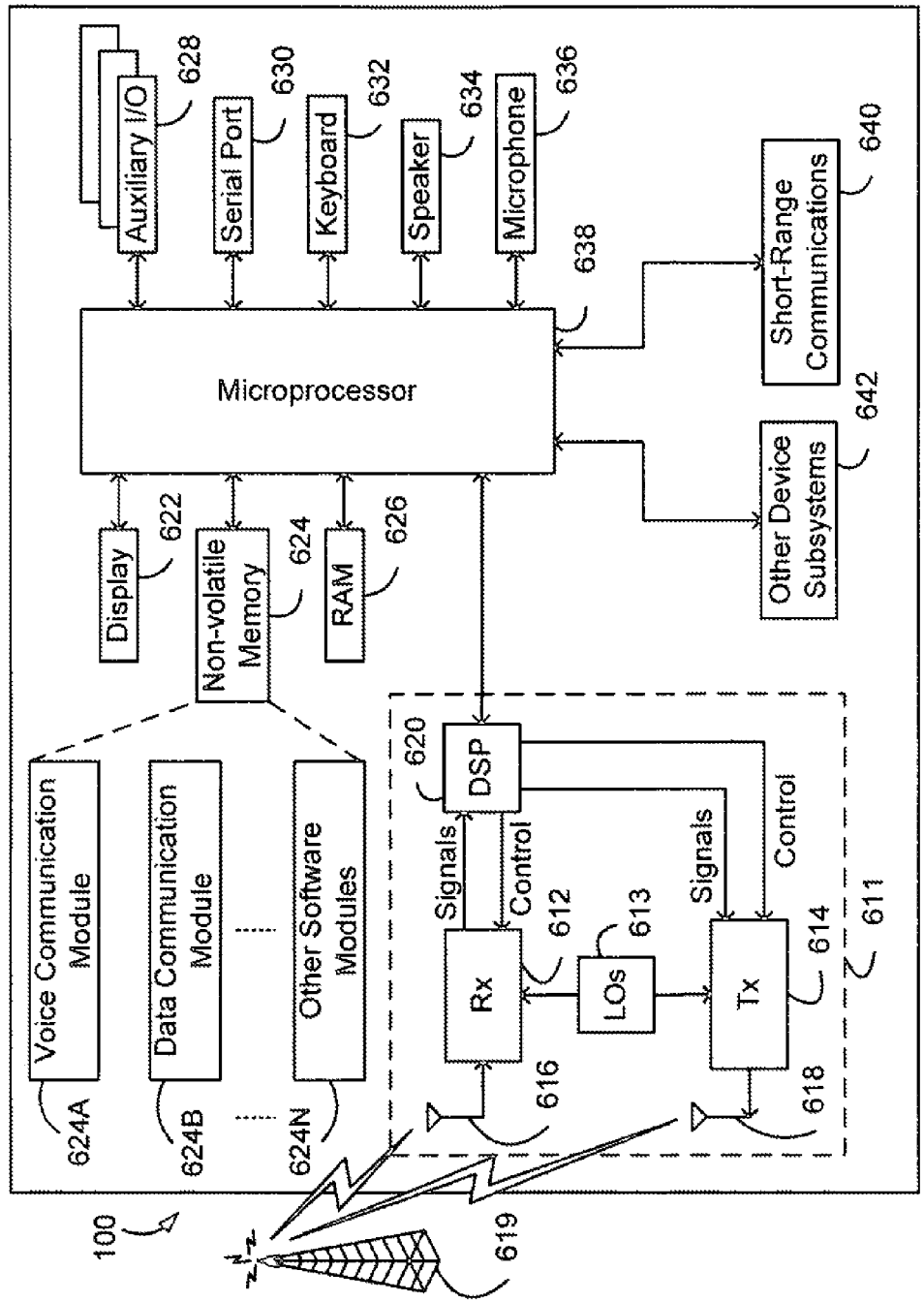
FIG. 10 is a block diagram of an example mobile device.

As another example of the wide scope of the systems and methods disclosed herein, the systems and methods may be used with many different computers and devices, such as a wireless mobile communications device shown in FIG. 10. With reference to FIG. 10, the mobile device 100 is a dual-mode mobile device and includes a transceiver 611, a microprocessor 638, a display 622, non-volatile memory 624, random access memory (RAM) 626, one or more auxiliary input/ output (I/O) devices 628, a serial port 630, a keyboard 632, a speaker 634, a microphone 636, a short-range wireless communications sub-system 640, and other device sub-systems 642.

The transceiver 611 includes a receiver 612, a transmitter 614, antennas 616 and 618, one or more local oscillators 613, and a digital signal processor (DSP) 620. The antennas 616 and 618 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 10 by the communication tower 619. These voice and data networks may be separate communication networks using separate infrastructure, such as base stations, network controllers, etc., or they may be integrated into a single wireless network.

The transceiver 611 is used to communicate with the network 619, and includes the receiver 612, the transmitter 614, the one or more local oscillators 613 and the DSP 620. The DSP 620 is used to send and receive signals to and from the transceivers 616 and 618, and also provides control information to the receiver 612 and the transmitter 614. If the voice and data communications occur at a single frequency, or closely-spaced sets of frequencies, then a single local oscillator 613 may be used in conjunction with the receiver 612 and the transmitter 614. Alternatively, if different frequencies are utilized for voice communications versus data communications for example, then a plurality of local oscillators 613 can be used to generate a plurality of frequencies corresponding to the voice and data networks 619. Information, which includes both voice and data information, is communicated to and from the transceiver 611 via a link between the DSP 620 and the microprocessor 638.

The detailed design of the transceiver 611, such as frequency band, component selection, power level, etc., will be dependent upon the communication network 619 in which the mobile device 100 is intended to operate. For example, a mobile device 100 intended to operate in a North American market may include a transceiver 611 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 619, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 619, other than any legally required operations, such as '911' emergency calling.

After any required network registration or activation procedures have been completed, the mobile device 100 may the send and receive communication signals, including both voice and data signals, over the networks 619. Signals received by the antenna 616 from the communication network 619 are routed to the receiver 612, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 620. In a similar manner, signals to be transmitted to the network 619 are processed, including modulation and encoding, for example, by the DSP 620 and are then provided to the transmitter 614 for digital to analog conversion, frequency up conversion, filtering, amplification and transmission to the communication network 619 via the antenna 618.

In addition to processing the communication signals, the DSP 620 also provides for transceiver control. For example, the gain levels applied to communication signals in the receiver 612 and the transmitter 614 may be adaptively controlled through automatic gain control algorithms implemented in the DSP 620. Other transceiver control algorithms could also be implemented in the DSP 620 in order to provide more sophisticated control of the transceiver 611.

The microprocessor 638 preferably manages and controls the overall operation of the mobile device 100. Many types of microprocessors or microcontrollers could be used here, or, alternatively, a single DSP 620 could be used to carry out the functions of the microprocessor 638. Low-level communication functions, including at least data and voice communications, are performed through the DSP 620 in the transceiver 611. Other, high-level communication applications, such as a voice communication application 624A, and a data communication application 624B may be stored in the non-volatile memory 624 for execution by the microprocessor 638. For example, the voice communication module 624A may provide a high-level user interface operable to transmit and receive voice calls between the mobile device 100 and a plurality of other voice or dual-mode devices via the network 619. Similarly, the data communication module 624B may provide a high-level user interface operable for sending and receiving data, such as e-mail messages, files, organizer information, short text messages, etc., between the mobile device 100 and a plurality of other data devices via the networks 619.

The microprocessor 638 also interacts with other device subsystems, such as the display 622, the RAM 626, the auxiliary input/output (I/O) subsystems 628, the serial port 630, the keyboard 632, the speaker 634, the microphone 636, the short-range communications subsystem 640 and any other device subsystems generally designated as 642.

Some of the subsystems shown in FIG. 10 perform communication-related functions, whereas other subsystems may provide "resident" or on-device functions. Notably, some subsystems, such as the keyboard 632 and the display 622 may be used for both communication-related functions, such as entering a text message for transmission over a data communication network, and device-resident functions such as a calculator or task list or other PDA type functions.

Operating system software used by the microprocessor 638 is preferably stored in a persistent store such as non-volatile memory 624. The non-volatile memory 624 may be implemented, for example, as a Flash memory component, or as battery backed-up RAM. In addition to the operating system, which controls low-level functions of the mobile device 610, the non-volatile memory 624 includes a plurality of software modules 624A-624N that can be executed by the microprocessor 638 (and/or the DSP 620), including a voice communication module 624A, a data communication module 624B, and a plurality of other operational modules 624N for carrying out a plurality of other functions. These modules are executed by the microprocessor 638 and provide a high-level interface between a user and the mobile device 100. This interface typically includes a graphical component provided through the display 622, and an input/output component provided through the auxiliary I/O 628, keyboard 632, speaker 634, and microphone 636. The operating system, specific device applications or modules, or parts thereof, may be temporarily loaded into a volatile store, such as RAM 626 for faster operation. Moreover, received communication signals may also be temporarily stored to RAM 626, before permanently writing them to a file system located in a persistent store such as the Flash memory 624.

An exemplary application module 624N that may be loaded onto the mobile device 100 is a personal information manager (PIM) application providing PDA functionality, such as calendar events, appointments, and task items. This module 624N may also interact with the voice communication module 624A for managing phone calls, voice mails, etc., and may also interact with the data communication module for managing e-mail communications and other data transmissions. Alternatively, all of the functionality of the voice communication module 624A and the data communication module 624B may be integrated into the PIM module.

The non-volatile memory 624 preferably also provides a file system to facilitate storage of PIM data items on the device. The PIM application preferably includes the ability to send and receive data items, either by itself, or in conjunction with the voice and data communication modules 624A, 624B, via the wireless networks 619. The PIM data items are preferably seamlessly integrated, synchronized and updated, via the wireless networks 619, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 626. Such information may instead be stored in the non-volatile memory 624, for example, when storage intervals are relatively short, such that the information is removed from memory soon after it is stored. However, storage of this information in the RAM 626 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 630 of the mobile device 100 to the serial port of a computer system or device. The serial port 630 may also be used to enable a user to set preferences through an external device or software application, or to download other application modules 624N for installation. This wired download path may be used to load an encryption key onto the device, which is a more secure method than exchanging encryption information via the wireless network 619. Interfaces for other wired download paths may be provided in the mobile device 100, in addition to or instead of the serial port 630. For example, a USB port would provide an interface to a similarly equipped personal computer.

Additional application modules 624N may be loaded onto the mobile device 100 through the networks 619, through an auxiliary I/O subsystem 628, through the serial port 630, through the short-range communications subsystem 640, or through any other suitable subsystem 642, and installed by a user in the non-volatile memory 624 or RAM 626. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 611 and provided to the microprocessor 638, which preferably further processes the received signal in multiple stages as described above, for eventual output to the display 622, or, alternatively, to an auxiliary I/O device 628. A user of mobile device 100 may also compose data items, such as e-mail messages, using the keyboard 632, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 628, which may include a thumbwheel input device, a touchpad, a variety of switches, a rocker input switch, etc. The composed data items input by the user may then be transmitted over the communication networks 619 via the transceiver module 611.

When the mobile device 100 is operating in a voice communication mode, the overall operation of the mobile device is substantially similar to the data mode, except that received signals are preferably be output to the speaker 634 and voice signals for transmission are generated by a microphone 636. Alternative voice or audio I/O subsystems, such as a voice message recording subsystem, may also be implemented on the mobile device 100. Although voice or audio signal output is preferably accomplished primarily through the speaker 634, the display 622 may also be used to provide an indication of the identity of a calling party, the duration of a voice call, or other voice call related information. For example, the microprocessor 638, in conjunction with the voice communication module and the operating system software, may detect the caller identification information of an incoming voice call and display it on the display 622.

A short-range communications subsystem 640 is also included in the mobile device 100. The subsystem 640 may include an infrared device and associated circuits and components, or a short-range RF communication module such as a Bluetooth™ module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

It is further noted that the systems and methods may be implemented on various types of computer architectures and data signals to/from a device may be conveyed via fiber optic medium, carrier waves, wireless networks, etc. for communication among multiple devices. The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code, such as Java.

The invention claimed is:

1. A system for operation upon a wireless mobile device to handle message notifications, the system comprising: a display; a processor configured to:
   in response to the mobile device displaying a portion of a message received from a sender, generate a signed receipt notification although the entire message to be displayed has not been received by the wireless mobile device.

2. The system of claim 1, wherein the signed receipt provides an indication to the sender that the message has been verified by an intended recipient of the message.

3. The system of claim 1, wherein generation of the signed receipt includes verifying the message; and
   wherein after the message is verified, the signed receipt is provided to the sender.

4. The system of claim 1, wherein the signed receipt is digitally signed by a recipient through use of a private key of the recipient.

5. The system of claim 1, wherein the message is an email message.

6. The system of claim 1, wherein the processor is further configured to:
   process the received message portion so that at least the portion of the sender's message is displayed to a user of the wireless mobile device before a signed receipt is provided to the sender.

7. The system of claim 6, wherein the user is prompted to send the signed receipt when the user exits the displayed message irrespective of whether the entire message of the sender has been sent to the device.

8. The system of claim 6, wherein the user is prompted for the user's password for use in generating a digitally signed receipt.

9. The system of claim 1, wherein interface indicators are provided to indicate the status with respect to a signed receipt.

10. A non-transitory computer-readable medium capable of causing a computing mobile device to perform the method of:
    in response to the mobile device displaying a portion of a message received from a sender, generating a signed receipt notification although the entire message to be displayed has not been received by the wireless mobile device.

11. A system for operation upon a wireless mobile device to handle message notifications, the system comprising: means for generating a read signed receipt notification in response to the mobile device displaying a portion of a message received from a sender; means for transmitting the signed receipt notification to the sender although the entire message has not been received by the wireless mobile device.

12. The system of claim 11, wherein the signed receipt provides an indication to the sender that the message has been verified by an intended recipient of the message.

13. The system of claim 11, wherein generation of the signed receipt includes verifying the message; and
    wherein after the message is verified, the signed receipt is provided to the sender.

14. The system of claim 11, wherein the signed receipt is digitally signed by a recipient through use of a private key of the recipient.

15. The system of claim 11, wherein the message is an email message.

16. The system of claim 11, further comprising:
    a display; and
    means for processing the received message portion so that at least the portion of the sender's message is displayed on the display before a signed receipt is provided to the sender.

17. The system of claim 16, further comprising:
    means for prompting a user of the wireless mobile device to send the signed receipt when the user exits the displayed message irrespective of whether the entire message of the sender has been sent to the device; and
    means for prompting the user for the user's password for use in generating a digitally signed receipt.

18. The system of claim 11, wherein interface indicators are provided to indicate the status with respect to a signed receipt.

* * * * *

UNITED STATES PATENT AND TRADEMARK OFFICE
CERTIFICATE OF CORRECTION

| | | |
|---|---|---|
| PATENT NO. | : 8,781,443 B2 | Page 1 of 1 |
| APPLICATION NO. | : 13/891465 | |
| DATED | : July 15, 2014 | |
| INVENTOR(S) | : Adams et al. | |

It is certified that error appears in the above-identified patent and that said Letters Patent is hereby corrected as shown below:

On the title page, Item [63], delete "11/518,104" and insert -- 11/158,104 --

Signed and Sealed this
Seventh Day of October, 2014

Michelle K. Lee
*Deputy Director of the United States Patent and Trademark Office*